United States Patent [19]

Vora et al.

[11] Patent Number: 4,978,742

[45] Date of Patent: * Dec. 18, 1990

[54] POLYMERS PREPARED FROM 2-(3-AMINOPHENYL)-2-(4-AMINOPHENYL) HEXAFLUORO PROPANE

[75] Inventors: Rohitkumar H. Vora, West Warwick, R.I.; Werner H. Mueller, Corpus Christi, Tex.

[73] Assignee: Hoechst Celanese Corp., Somerville, N.J.

[*] Notice: The portion of the term of this patent subsequent to Aug. 28, 2007 has been disclaimed.

[21] Appl. No.: 252,428

[22] Filed: Sep. 30, 1988

[51] Int. Cl.$^5$ .................... C08G 12/00; C08G 63/00; C08G 69/26

[52] U.S. Cl. .................... 528/353; 528/176; 528/188; 528/229

[58] Field of Search ................. 528/353, 176, 188, 229

[56] References Cited

U.S. PATENT DOCUMENTS

| | | | |
|---|---|---|---|
| 3,328,352 | 6/1967 | Kwolek | 260/47 |
| 3,356,648 | 12/1967 | Rogers | 260/47 |
| 3,792,148 | 2/1974 | Reske | 264/331 |
| 4,075,172 | 2/1978 | Ozawa | 260/65 |
| 4,111,906 | 9/1978 | Jones | 528/229 |
| 4,592,925 | 6/1986 | DuPont | 427/74 |

FOREIGN PATENT DOCUMENTS

1062435 3/1963 United Kingdom ............... 528/353

*Primary Examiner*—John Kight, III
*Assistant Examiner*—P. Hampton-Hightower
*Attorney, Agent, or Firm*—Perman & Green

[57] ABSTRACT

Polyimides and polyamide-acids having improved solubility and processing characterisitcs are provided having incorporated into the polymeric chain as a novel aromatic diamine compound, 2-(3-aminophenyl)-2-(4-aminophenyl) hexafluoropropane (3,4'-6F Diamine). The polyamide-acids and polyimides are prepared by reacting the 3,4'-6F Diamine with aromatic tetracarboxylic acids or anhydrides thereof. It has been found that the polyimides of this invention have improved solubility characterisitics, low dielectric constants and improved thermal flow properties as a consequence of the meta/para positioning of the amino groups on the diamine, which renders these polymers more readily melt spinnable for the production of fibers. The polymers may also be compression molded and fabricated into composites at moderate temperatures and pressures. Solutions of the polyimides may be cast into films.

13 Claims, No Drawings

POLYMERS PREPARED FROM 2-(3-AMINOPHENYL)-2-(4-AMINOPHENYL) HEXAFLUORO PROPANE

BACKGROUND OF THE INVENTION

1. Field of the Invention

This invention relates to new fluorine-containing polyimides and polyamide-acids which exhibit improved solubility in common organic solvents, low dielectric constants and improved thermal flow properties.

2. Description of Related Art

Polyimides are widely used in the aerospace industry and electronics industry, because of their toughness, low density, thermal stability, radiation resistance and mechanical strength. However, it is recognized that polyimides are difficult to process. The processing problems arise from the insolubility of polyimides in most of the more common solvents. Consequently, products have been fabricated from polyamide-acid intermediates, which are more soluble but less stable, and then imidized by the application of heat to provide the desired end product. The disadvantage of this process is that the water liberated during the imidization of the polyamide-acid forms undesirable voids or surface irregularities in the final product which reduces its mechanical properties.

It has been suggested that polyimides having hexafluoroisopropylidene linking group in the diamine and-/or dianhydride comonomers have improved solubility properties. Several patents disclose polyimides prepared from diamines of this type. For example, U.S. Pat. No. 3,356,648 to Rogers discloses polyimides prepared from 2,2-bis(4-aminophenyl) hexafluoropropane; U.S. Pat. No. 4,592,925 to DuPont et al. discloses polyimides prepared from 2,2-bis(3-aminophenyl) hexafluoropropane; U.S. Pat. No. 4,111,906 to Jones et al. discloses polyimides prepared from 2,2-bis[4-(4-aminophenoxy)-phenyl]hexafluoropropane; and U.S. Pat. No. 4,477,648 to Jones et al. discloses polyimides prepared from 2,2-bis[(2-halo-4-aminophenoxy)phenyl]hexafluoropropane. In addition, U.S. Pat. No. 4,592,925 discloses polyimides prepared by reacting 2,2-bis(3-aminophenyl) hexafluoropropane and 4,4,-hexafluoroisopropylidenebis (phthalic anhydride), also known as 2,2-bis(3,4-dicarboxyphenyl) hexafluoropropane dianhydride.

It is also known in the art to prepare polyamides by condensing a mixture of diamines, including a 3,4'-diamino diphenyl compound, with a dicarboxylic acid, such as disclosed in U.S. Pat. No. 4,075,172. Similar polyamides are suggested in U.S. Pat. No. 3,792,148. However, neither of these patents suggests polyamides or polyimides containing the hexafluoroisopropylidene group.

SUMMARY OF THE INVENTION

The present invention provides polyimides and polyamide-acids having improved solubility and processing characteristics having incorporated into the polymeric chain the novel aromatic diamine compound 2-(3-aminophenyl)-2-(4-aminophenyl) hexafluoropropane, hereinafter referred to as meta/para-6F Diamine or 3,4'-6F Diamine. The polyamide-acids and polyimides are prepared by reacting the 3,4'-6F Diamine with aromatic tetracarboxylic acids or anhydrides thereof. It has been found that the polyimides of this invention have improved solubility characteristics, low dielectric constants and improved thermal flow properties as a consequence of the meta/para positioning of the amino groups on the diamine, which renders these polymers more readily melt spinnable for the production of fibers. The polymers may also be compression molded and fabricated into composites at moderate temperatures and pressures.

DETAILED DESCRIPTION OF THE INVENTION

The polyimides of this invention may be characterized as comprised of recurring groups having the structure:

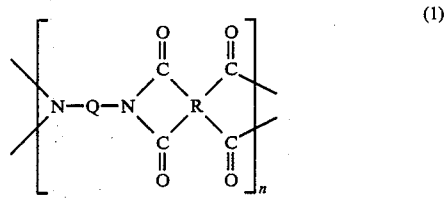

(1)

wherein n is the number of repeating groups, R is a tetravalent aromatic organic radical wherein each pair of carbonyl groups are attached to adjacent carbons in the ring of moiety R, and Q is the imidized residuum of 2-(3-aminophenyl)-2-(4-aminophenyl) hexafluoropropane having the formula:

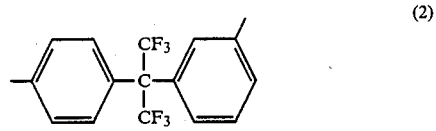

(2)

Preferably R in formula 1 comprises a phenylene, naphthalene or a bis-phenylene type compound, or a mixture of such compounds, all of which may be unsubstituted or substituted with halogen, hydroxy, lower $C_1$ to $C_6$ alkyl or lower $C_1$–$C_6$ alkoxy groups, and n is a number sufficient to provide an inherent viscosity of at least about 0.2 dl/g as measured from a solution of the polymer in dimethylacetamide at 25° C. at a polymer concentration of 0.5 weight percent.

Illustrative of tetracarboxylic acid dianhydrides which are suitable for use in the present invention are:
1,2,4,5-benzene tetracarboxylic acid dianhydride;
1,2,3,4-benzene tetracarboxylic acid dianhydride;
1,4-bis(2,3-dicarboxyphenoxy) benzene dianhydride;
1,3-bis(3,4-dicarboxyphenoxy) benzene dianhydride;
1,2,4,5-naphthalene tetracarboxylic acid dianhydride;
1,2,5,6-naphthalene tetracarboxylic acid dianhydride;
1,4,5,8-naphthalene tetracarboxylic acid dianhydride;
2,3,6,7-naphthalene tetracarboxylic acid dianhydride;
2,6-dichloronaphthalene-1,4,5,8-tetracarboxylic acid dianhydride;
2,7-dichloronaphthalene-1,4,5,8-tetracarboxylic acid dianhydride;
2,3,6,7-tetrachloronaphthalene-1,4,5,8-tetracarboxylic acid dianhydride;
3,3',4,4'-diphenyl tetracarboxylic acid dianhydride;
2,2',3,3'-diphenyl tetracarboxylic acid dianhydride;
4,4'-bis(3,4-dicarboxyphenoxy)diphenyl dianhydride;
bis(2,3-dicarboxyphenyl) ether dianhydride;
4,4'-bis(2,3-dicarboxyphenoxy) diphenyl ether dianhydride;

4,4'-bis(3,4-dicarboxyphenoxy) diphenyl ether dianhydride;
bis(3,4-dicarboxyphenyl) sulfide dianhydride; dianhydride;
4,4'-bis(3,4-dicarboxyphenoxy) diphenyl sulfide dianhydride;
bis(3,4-dicarboxyphenyl) sulfone dianhydride;
4,4'-bis(2,3-dicarboxyphenoxy) diphenyl sulfone dianhydride;
4,4'-bis(3,4-dicarboxyphenoxy) diphenyl sulfone dianhydride;
3,3',4,4'-benzophenone tetracarboxylic acid dianhydride;
2,2',3,3'-benzophenone tetracarboxylic acid dianhydride;
2,3,3'4'-benzophenone tetracarboxylic acid dianhydride;
4,4'-bis(3,4-dicarboxyphenoxy) benzophenone dianhydride;
bis(2,3-dicarboxyphenyl) methane dianhydride;
bis(3,4-dicarboxyphenyl) methane dianhydride;
1,1-bis(2,3-dicarboxyphenyl) ethane dianhydride;
1,1-bis(3,4-dicarboxyphenyl) ethane dianhydride;
1,2-bis(3,4-dicarboxyphenyl) ethane dianhydride;
2,2-bis(2,3-dicarboxyphenyl) propane dianhydride;
2,2-bis(3,4-dicarboxyphenyl) propane dianhydride;
2,2-bis[4-(2,3-dicarboxyphenoxy) phenyl]propane dianhydride;
2,2-bis[4-(3,4-dicarboxyphenoxy) phenyl]propane dianhydride;
4-(2,3-dicarboxyphenoxy)-4,-(3,4-dicarboxyphenoxy) diphenyl-2,2-propane dianhydride;
2,2-bis[4-(3,4-dicarboxyphenoxy-3,5-dimethyl) phenyl]-propane dianhydride;
2,3,4,5-thiophene tetracarboxylic acid dianhydride;
2,3,4,5-pyrrolidine tetracarboxylic acid dianhydride;
2,3,5,6-pyrazine tetracarboxylic acid dianhydride;
1,8,9,10-phenanthrene tetracarboxylic acid dianhydride;
3,4,9,1-perylene tetracarboxylic acid dianhydride;
2,2-bis(3,4-dicarboxyphenyl) hexafluoropropane dianhydride;
1,3-bis(3,4-dicarboxyphenyl) hexafluoropropane dianhydride;
1,1-bis(3,4-dicarboxyphenyl)-1-phenyl-2,2,2-trifluoroethane dianhydride:
2,2-bis[4-(3,4-dicarboxyphenoxy) phenyl]hexafluoropropane dianhydride:
1,1-bis[4-(3,4-dicarboxyphenoxy) phenyl]-1-phenyl-2,2,2-trifluoroethane dianhydride; and
4,4'-bis[2-(3,4-dicarboxyphenyl)hexafluoroisopropyl]-diphenyl ether dianhydride.

One skilled in the art will recognize that the tetracarboxylic acids and acid-esters of the above-listed dianhydride compounds may also be used to produce the polyimides. These tetracarboxylic acids or derivatives thereof are available or may be prepared by known methods. For example, U.S. Pat. No. 3,847,867 to Heath et al. and U.S. Pat. No. 4,650,850 to Howson, which are incorporated herein by reference, show the preparation of bis(ether anhydrides) and bis(dialkyl aromatic ether anhydrides), respectively. The preparation of fluorine-containing dianhydrides is disclosed in U.S. Pat. No. 3,310,573 to Gordon and U.S. Pat. No. 3,649,601 to Critchley et al., which are also incorporated herein by reference.

The preferred polyimides of this invention are prepared by reacting the 3,4,-6F Diamine with 1,2,4,5-benzene tetracarboxylic acid dianhydride (also known as pyromelittic dianhydride-PMDA), bis(3,4-dicarboxyphenyl) ether dianhydride (also known as oxyphthalic dianhydride-ODPA), 3,3',4,4'-benzophenone tetracarboxylic acid dianhydride (also known as benzo phenonetetracarboxylic dianhydride-BTDA), 3,4',4,4'-diphenyl tetracarboxylic acid dianhydride (BPDA), 2,2-bis(3,4dicarboxyphenyl) hexafluoropropane dianhydride (6FDA), and 4,4'-bis[2-(3,4 dicarboxyphenyl) hexafluoroisopropyl]diphyenyl ether dianhydride (12 FDA).

Polyimides of the present invention may also be prepared using a mixture of 3,4'-6F Diamine and one or more other diamines having the formula:

$$NH_2-Y-NH_2 \quad (3)$$

wherein Y is an aromatic moiety of a phenylene naphthalene or bis-phenylene type compound which may be unsubstituted or ring substituted with halogen, hydroxy, lower $C_1$ to $C_6$ alkyl or lower $C_1$ to $C_6$ alkoxy groups. Where such diamine mixtures are employed, the molar ratio of 3,4'-6F Diamine and said one or more other diamines is preferably within the range of about 2 to 1 to about 1 to 2 based on the total moles of diamine present.

Illustrative of diamines which are suitable for use in mixtures with 3,4'-6F Diamine are:
m-phenylene diamine;
p-phenylene diamine;
1,3-bis(4-aminophenyl) propane;
2,2-bis(4-aminophenyl) propane;
4,4'-diamino-diphenyl methane;
1,2-bis(4-aminophenyl) ethane;
1,1-bis(4-aminophenyl) ethane;
2,2'-diamino-diethyl sulfide;
bis(4-aminophenyl) sulfide;
2,4'-diamino-diphenyl sulfide;
bis(3-aminophenyl)sulfone;
bis(4-aminophenyl) sulfone;
4,4'-diamino-dibenzyl sulfoxide;
bis(4-aminophenyl) ether;
bis(3-aminophenyl) ether;
bis(4-aminophenyl)diethyl silane;
bis(4-aminophenyl) diphenyl silane;
bis(4-aminophenyl) ethyl phosphine oxide;
bis(4-aminophenyl) phenyl phosphine oxide;
bis(4-aminophenyl)-N-phenylamine;
bis(4-aminophenyl)-N-methylamine;
1,2-diamino-naphthalene;
1,4-diamino-naphthalene;
1,5-diamino-naphthalene;
1,6-diamino-naphthalene;
1,7-diamino-naphthalene;
1,8-diamino-naphthalene;
2,3-diamino-naphthalene;
2,6-diamino-naphthalene;
1,4-diamino-2-methyl-naphthalene;
1,5-diamino-2-methyl-naphthalene;
1,3-diamino-2-phenyl-naphthalene;
4,4'-diamino-biphenyl;
3,3'-diamino-biphenyl;
3,3'-dichloro-4,4'-diamino-biphenyl;
3,3'-dimethyl-4,4'-diamino-biphenyl;
3,4'-dimethyl-4,4'-diamino-biphenyl;
3,3'-dimethoxy-4,4'-diamino-biphenyl;
4,4'-bis(4-aminophenoxy)-biphenyl;
2,4-diamino-toluene;
2,5-diamino-toluene;

2,6-diamino-toluene;
3,5-diamino-toluene;
1,3-diamino-2,5-dichloro-benzene;
1,4-diamino-2,5-dichloro-benzene;
1-methoxy-2,4-diamino-benzene;
1,4-diamino-2-methoxy-5-methyl-benzene;
1,4-diamino-2,3,5,6-tetramethyl-benzene;
1,4-bis(2-methyl-4-amino-pentyl)-benzene;
1,4-bis(1,1-dimethyl-5-amino-pentyl)-benzene;
1,4-bis(4-aminophenoxy)-benzene;
o-xylylene diamine;
m-xylylene diamine;
p-xylylene diamine;
3,3'-diamino-benzophenone;
4,4'-diamino-benzophenone;
2,6-diamino-pyridine;
3,5-diamino-pyridine;
1,3-diamino-adamantane;
3,3'-diamino-1,1,1'-diadamantane;
N-(3-aminophenyl)-4-aminobenzamide;
4-aminophenyl-3-aminobenzoate;
2,2-bis(4-aminophenyl) hexafluoropropane;
2,2-bis(3-aminophenyl) hexafluoropropane;
2,2-bis[4-(4-aminophenoxy)phenyl]hexafluoropropane;
2,2-bis[4-(2-chloro-4-aminophenoxy)phenyl hexafluoropropane;
1,1-bis(4-aminophenyl)-1-phenyl-2,2,2-trifluoroethane;
1,1-bis[4-(4-aminophenoxy)phenyl]-1-phenyl-2,2,2-trifluoroethane;
1,4-bis(3-aminophenyl)buta-1-ene-3-yne;
1,3-bis(3-aminophenyl) hexafluoropropane;
1,5-bis(3-aminophenyl) decafluoropentane; and mixtures thereof.

A preferred process for preparing the polyimides of this invention involves first preparing a polyamide-acid by reacting the diamine and the tetracarboxylic acid or derivative such as the dianhydride in an organic solvent, preferably under substantially anhydrous conditions for a time and at a temperature sufficient to provide at least 50% of the corresponding polyamide-acid, and then converting the polyamide-acid to the polyimide. Suitable conditions for reacting the diamine and the dianhydride are disclosed in detail in U.S. Pat. Nos. 3,356,648 and 3,959,350, both to Rogers, which are incorporated herein by reference. The intermediate polyamide-acid may also be esterified to provide polyamide-esters.

In a preferred process for preparing the polyimides, electronic grade diamine and dianhydride may be reacted in N-methyl pyrrolidone, gamma-butyrolactone (BLO), or a mixture of BLO and another solvent such as diglyme. The resulting product is a polyamide-acid which is then converted to the desired polyimide by one of several methods: heating the polyamide-acid solution until imidization is substantially complete, or by combining the polyamide-acid solution and a dehydrating agent, with or without catalyst, and optionally heating the resulting mixture until imidization is substantially complete.

In the preferred embodiment of the invention, the diamine and the dianhydride components are reacted in approximately equi-molar amounts.

The following examples are illustrative of the invention.

EXAMPLE 1

2-(3-aminophenyl)-2-(4-aminophenyl)hexafluoropropane monomer was prepared by a six step process employing 2-(4-methylphenyl)hexafluoropropane-2-ol and benzene as starting materials as follows:

(a) Preparation of 2-(4-Methylphenyl)-2-phenylhexafluoropropane.

1290 g of 2-(4-methylphenyl)hexafluoropropan-2-ol and 780 g of benzene were placed in a 5-liter steel autoclave and 1500 g of anhydrous hydrogen fluoride was pumped into the sealed autoclave. The reaction mixture was heated at 170°–175° C. with stirring for 64 hours. After completion of the reaction, hydrogen fluoride gas was allowed to escape at 80° C., and the liquid product was then washed twice with water, dried over calcium chloride, and fractionally distilled. Boiling point 135°–136° C./1.4 mbar. Yield: 1424 g (89.5%).

(b) Preparation of 2-(4-Carboxyphenol)-2-phenylhexafluoropropane 298 g of 2-(4-methylphenyl)-2-phenylhexafluoropropane prepared in step (a), 2.49 g of cobalt (II) acetate tetrahydrate, 2.45 g of manganese (IV) acetate tetrahydrate, and 0.41 g of hydrogen bromide (corresponding to 4.1 g of a 10% HBr solution in glacial acetic acid) were placed in a 1-liter glass autoclave. The mixture was heated under an oxygen pressure of 6.5 bar up to approximately 180° C. with an exothermic reaction, and was allowed to stand for 1 hour at 170°–180° C. 200 g of acetic acid was then distilled from the reaction solution cooled to approximately 100° C. 275 g of water was added slowly to the solution remaining in the flask (approximately 600 g) at the boiling point. The carboxylic acid that crystallized out was filtered by suction and washed twice with 75-ml portions of 50% aqueous acetic acid and five times with 85-ml portions of water, and was dried at 60° C./60 mbar. Yield: 311 g (95.5%).

(c) preparation of 2-(4-carboxyphenol)-2-(3-nitrophenyl)hexafluoropropane 261 g of 2-(4-carboxyphenol)-2-phenylhexafluoropropane prepared in step (b) was suspended in 500 ml of methylene chloride, and after the addition of 188 ml of concentrated sulfuric acid, 75 ml of concentrated nitric acid was added dropwise at −5° to 0° C. The reaction mixture was stirred for 1 hour longer at this temperature and was then poured onto 2000 g of ice. The solid was filtered off and washed with water until the rinse water had a pH of 3–4. Crude product 208 g, M.p. 180°–185° C. Workup of the filtrate: The organic phase was separated, washed twice with water, dried over magnesium sulfate, and evaporated. The sticky yellow residue was recrystallized twice from toluene, after which an additional 30 g of crude product was obtained with a melting point of 180°–184° C.

The combined amount of crude product (238 g) was recrystallized twice from toluene, after which 186 g (63%) of a white solid was obtained that had a purity of 99.2%, determined by gas chromatography.

(d) Preparation of 2-(4-carbamoylphenyl)-2-(nitrophenyl)hexafluoropropane.

198 g of 2-(4-carboxyphenyl)-2-(3-nitrophenyl) hexafluoropropane prepared in step (c) was introduced into a mixture of 700 ml of concentrated sulfuric acid and 350 ml of oleum (65%). After the addition of 200 g of sulfamic acid, the reaction mixture was heated for 3 hours at 90°–95° C. The suspension cooled to approximately 20° C. was poured onto approximately 6 kg of ice with constant stirring. The precipitated solid was then filtered off and washed with water until neutral. Yield: 191 g (97%) of white solid. M.p.: 147°–148° C.

(e) Preparation of 4,4,-Bis[2-(3-nitrophenyl)hexafluoroisopropyl]azobenzene, 157 g of 2(4-carbamoylphenyl)-2-(3-nitrophenyl) hexafluoropropane prepared in step (d) was introduced at 0 to 5° C. into a mixture of 900 ml of 13% aqueous sodium hypochlorite solution, 150 ml of 50% sodium hydroxide solution, and 5 ml of tricaprylmethylammonium chloride. The suspension was stirred for 24 hours, during which the reaction temperature was not to exceed 50° C. The reaction mixture was neutralized with dilute acetic acid, and the solid was filtered off and washed with water. After recrystallization of the dried crude product (149 g), 61 g of a solid was obtained with a melting point of 185°–187° C. The workup of the mother liquor provided an additional 14 g of the product. Yield: 75 g (52%).

(f) Preparation of 2-(3-aminophenyl)-2-(4-aminophenyl)hexafluoropropane.

74.2 g of 4,4,-bis[2-(3-nitrophenyl)hexafluoroisopropyl]azobenzene prepared in step (e) was dissolved in 600 ml of ethyl acetate, 1 g of 5% Pd/C was added, and the mixture was reduced with hydrogen (100 bar) in an autoclave, first at 25° C., and when the reaction subsided, at 100° C. After filtering off the catalyst, the solvent was removed. The residue was taken up in dilute hydrochloric acid and treated with activated charcoal. The colorless filtrate obtained from this was neutralized with half-concentrated ammonia solution. The precipitate that separated was filtered off, washed with water, and dried to constant weight. Yield: 48 g (72%) of white solid. M.p.: 142°–143° C.

EXAMPLE 2

Preparation of a polyimide of 3,4,-6F Diamine and 6FDA.

To a 100 ml three necked flask fitted with a condenser, thermometer, stirrer and under nitrogen atmosphere, 6.68 grams (0.02 mole) of 2-(3-aminophenyl)-2-(4-aminophenyl) hexafluoropropane (3,4'6F Diamine) were charged along with 20 grams of distilled N-methyl pyrrolidone (NMP). The mixture was stirred until a clear solution was obtained. To this clear, pale yellow colored solution was added 8.88 grams (0.02 mole) of 2,2-bis (3,4 dicarboxyphenyl) hexafluoropropane dianhydride (6FDA) while stirring was continued. 42 grams of NMP was then added to the reaction mixture and agitation at room temperature was continued overnight for a period of about 20 hours. The resulting polyamide-acid (polyamic acid) had an inherent viscosity of 0.42 dl/g, measured at 0.5 g/dl at 25° C. in dimethyl acetamide.

The polyamide-acid was imidized as follows: 15.5 grams of acetic anhydride and 1.60 grams of beta-picoline are added to the polyamide-acid solution. The reaction mixture was stirred overnight for about 20 hours at room temperature and the resulting polyimide was precipitated in methanol, washed with fresh methanol and dried for 4 hours in a vacuum oven at 125° C. The polymer was found to be soluble in NMP, tetrahydrofuran, acetone, MEK, diglyme, DMAC, chloroform and BLO solvents.

EXAMPLES 3–7

Polyimides were prepared in accordance with the general procedure set forth in Example 2 by reacting the 3,4'-6F Diamine with equi-molar quantities of the following dianhydrides:

| | |
|---|---|
| EXAMPLE 3: | 1,2,4,5-benzene tetracarboxylic acid dianhydride (PMDA), |
| EXAMPLE 4: | 3,3',4,4'-diphenyl tetracarboxylic acid dianhydride (BPDA), |
| EXAMPLE 5: | 3,3',4,4'-benzophenone tetracarboxylic acid dianhydride (BTDA), |
| EXAMPLE 6: | bis(3,4-dicarboxyphenyl) ether dianhydride (ODPA). |
| EXAMPLE 7: | 4,4'-bis[2-(3,4 dicarboxyphenyl) hexafluoroisopropyl]diphenyl ether dianhydride (12 FDA) |

The inherent viscosity of each of the polyamide-acids (PA) and polyimides (PI) produced in Examples 2–7 are reported in Table 1. Also reported are the glass transition temperatures (Tg°C.) as measured by differential scanning calorimetry and the TGA temperature in degrees centigrade at which a 5% weight loss in air is encountered. The weight average (Mw) and number average (Mn) molecular weights of each polyimide is also reported, as well as the dispersity factor (d) which approximates the Mw divided by the Mn.

TABLE 1

| Example | Dianhydride | Inherent Viscosity dl/gm | | GPC | | | DSC Tg °C. | TGA 5% wt. loss at °C. |
|---|---|---|---|---|---|---|---|---|
| | | PA | PI | Mw | Mn | d | | |
| 2 | 6F-DA | 0.42 | 0.31 | 42127 | 13864 | 3.11 | 285 | 520 |
| 3 | PMDA | 0.53 | 0.30 | 37651 | 19174 | 2.0 | 350 | 530 |
| 4 | BPDA | 0.69 | 0.42 | 58480 | 33654 | 1.74 | 296 | 550 |
| 5 | BTDA | 0.80 | 0.48 | 81746 | 52689 | 1.51 | 271 | 540 |
| 6 | ODPA | 0.54 | 0.39 | 57405 | 27253 | 2.1 | 256 | 550 |
| 7 | 12FDA | 0.35 | 0.21 | 22340 | 13835 | 1.6 | 239 | 510 |

The polyimides exhibit good solubility properties in solvents such as N-methyl pyrrolidone (NMP), dimethyl acetamide (DMAc), diglyme, methylethylketone (MEK), tetrahydrofuran (THF), acetone, chloroform, butyrolactone (BLO), dimethylsulfoxide (DMS), dimethylformamide (DMF), propylene glycol methyl ether (PGME), and the like.

This is especially significant in the case of the polyamide of Example 2 (PMDA and 3,4'-6F Diamine) since the analogous polyimide based on PMDA and either 2,2-bis(3-aminophenyl) hexafluoropropane or 2,2-bis(4-aminophenyl) hexafluoropropane are not soluble or are only sparingly soluble in such solvents.

The polyimides also exhibit improved thermal flow properties and may be melt spun to form fibers and filaments. Because of their good solubility in common organic solvents, films may be cast from solvent solutions. Such films may be used as printed circuit backings, insulating dielectric interlayers and other applications where tough, high temperature stable films having good dielectric properties have been used in the past.

The polyimides of this invention may be molded using standard techniques such as compression molding or injection molding to produce melt fabricated articles such as safety masks, windshields, electronic circuit substrates, airplane windows or the like. They may be compounded with graphite, graphite fiber, molybdenum disulphide or PTFE for the production of self-lubricating wear surfaces useful for piston rings, valve seats, bearings and seals. They may also be compounded with fibers such as glass, graphite or boron fibers to produce molding compounds for high strength structural components such as jet engine components. The polyimides may also be compounded with friction materials to produce molding compounds for high temperature braking components or with abrasive materials such as diamonds for high speed grinding wheels.

The polyimides may be cast as films useful as wire and cable wraps, motor slot liners or flexible printed circuit substrates. They may be used as coatings on substrates such as aluminum or silicone dioxide. They are also useful to produce high temperature coatings for magnetic wire, dip coatings for various electronic components, protective coatings over glass, metal and plastic substrates, wear coatings, and photoresist coatings useful in microelectronic processing.

The polyimides may also be used to produce high temperature adhesives for bonding aerospace structures or electrical circuitry, conductive adhesives when mixed with conductive fillers such as silver or gold for microelectronic applications, or adhesives for glass, metal or plastic substrates.

The polyimides may also be used as varnish compositions or matrix resins to produce composites and laminates. The varnish compositions and matrix resins may be used to impregnate glass or quartz cloth, or graphite or boron fibers, for the production of radomes, printed circuit boards, radioactive waste containers, turbine blades, aerospace structural components or other structural components requiring high temperature performance, non-flammability and excellent electrical properties.

In general, the polyimides and polyamide-acid precursors of this invention may be used in all applications as disclosed in copending application Ser. No. 124,704, filed in the U.S. Patent and Trademark Office on Nov. 24, 1987, the disclosure of which application is incorporated herein by reference.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

What we claim is:

1. A polyimide polymer comprising recurring groups having the structure:

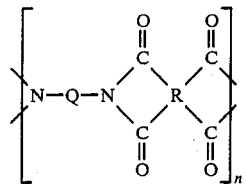

wherein n is the number of repeating groups, R is a tetravalent aromatic organic radical, and Q is the residuum having the formula:

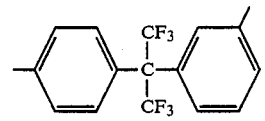

2. The polymer of claim 1 wherein R is selected from the group consisting of phenylene, naphthalene, a bisphenylene compound and mixtures thereof, which may be unsubstituted or ring substituted with a radical selected from the group consisting of halogen, hydroxy, lower $C_1$ to $C_6$ alkyl and lower $C_1$ to $C_6$ alkoxy.

3. The polymer of claim 1 wherein n is a number sufficient to provide an inherent viscosity of at least about 0.2 dl/g as measured from a solution of the polymer in dimethylacetamide at 25° C. at a polymer concentration of 0.5 weight percent.

4. The polymer of claim 1 prepared by forming the amide-acid condensation product of 2-(3-aminophenyl)-2-(4-aminophenyl) hexafluoropropane with an aromatic dianhydride and imidizing said amide-acid condensation product.

5. The polymer of claim 4 wherein said aromatic dianhydride is selected from the group consisting of bis (3,4-dicarboxyphenyl) ether dianhydride, 3,3',4,4'-benzophenone tetracarboxylic dianhydride, 3,3',4,4'-diphenyl tetracarboxylic acid dianhydride, 2,2-bis (3,4 dicarboxy phenyl) hexafluoropropane dianhydride, 1,2,4,5-benzene tetracarboxylic acid dianhydride, and 4,4'-bis[2-(3,4-dicarboxyphenyl) hexafluoroisopropyl]diphenyl ether dianhydride.

6. The polymer of claim 4 wherein said amide-acid condensation includes a mixture of said 2-(3-aminophenyl)-2-(4-aminophenyl) hexafluoropropane with at least one other diamine having the formula:

$$NH_2-Y-NH_2$$

wherein Y is an aromatic moiety.

7. The polymer of claim 5 wherein n is a number sufficient to provide an inherent viscosity of at least about 0.2 dl/g as measured from a solution of the polymer in dimethylacetamide at 25° C. at a polymer concentration of 0.5 weight percent.

8. The polymer of claim 7 wherein said dianhydride is 2,2-bis (3,4 dicarboxyphenyl) hexafluoropropane dianhydride.

9. The polymer of claim 8 wherein said diamine and said dianhydride are reacted in equi-molar amounts.

10. The polyimide of claim 1 dissolved in organic solvent.

11. A fiber comprising the polyimide of claim 1.

12. A film comprising the polyimide of claim 1.

13. A compression molded shaped article comprising the polyimide of claim 1.

* * * * *